J. W. & J. E. STINE.
HOSE COUPLING.
APPLICATION FILED APR. 4, 1911.
1,022,759.
Patented Apr. 9, 1912.
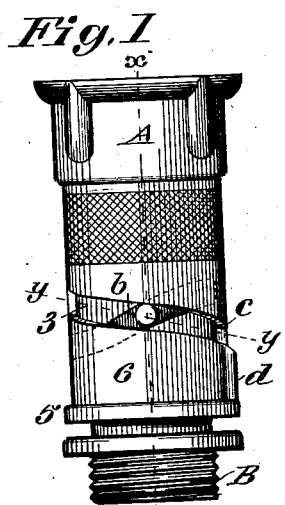
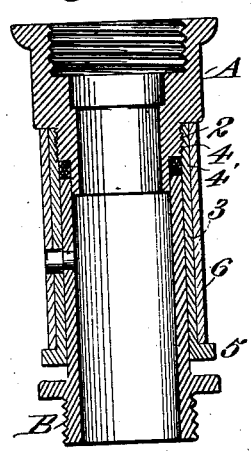
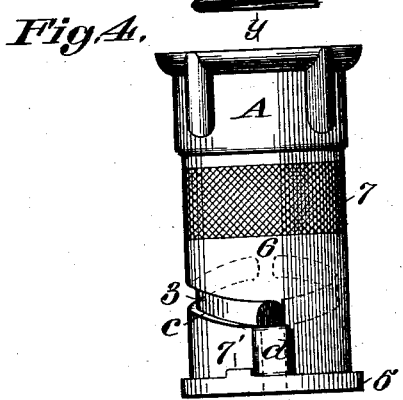
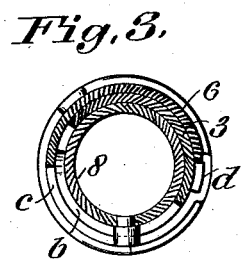
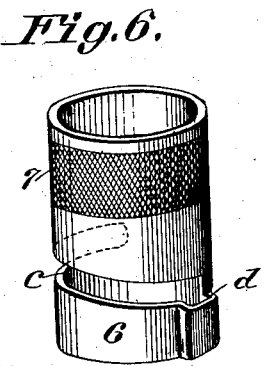
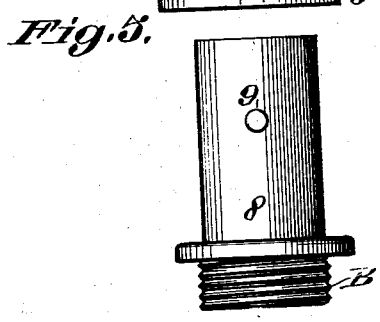
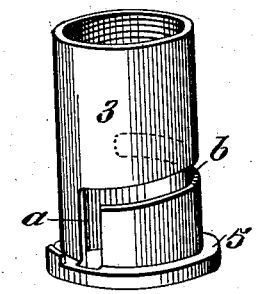
Witnesses:
Charles Pickles
R. S. Berry
Inventors:
John W. Stine,
John E. Stine.
By G. H. Strong  atty

UNITED STATES PATENT OFFICE.

JOHN W. STINE AND JOHN E. STINE, OF SAN FRANCISCO, CALIFORNIA.

HOSE-COUPLING.

1,022,759.

Specification of Letters Patent. Patented Apr. 9, 1912.

Application filed April 4, 1911. Serial No. 618,914.

*To all whom it may concern:*

Be it known that we, JOHN W. STINE and JOHN E. STINE, citizens of the United States, residing in the city and county of San Francisco and State of California, have invented new and useful Improvements in Hose-Couplings, of which the following is a specification.

This invention relates to a hose coupling. It is the object of this invention to provide a hose coupling which is simple in construction, economical in manufacture, and which can be easily and quickly applied.

Another object is to provide a hose coupling which is adapted to be automatically locked against uncoupling, and which is so arranged that it will form a tight joint or union when applied.

A further object is to provide a hose coupling which is non-leakable, and which is suitable for use in connecting a hose to a hydrant or nozzle, and is adapted to be employed in high pressure water distributing systems.

The invention consists of the parts and the combination and construction of parts as hereinafter more fully described and claimed, having reference to the accompanying drawings, in which—

Figure 1 is a side elevation of the invention in its coupled position. Fig. 2 is a vertical section on the line X—X, Fig. 1. Fig. 3 is a horizontal section on the line Y—Y, Fig. 1. Figs. 4 and 5 are views in elevation in conjunction showing the invention in its uncoupled position. Fig. 6 is a perspective view of the locking sleeve. Fig. 7 is a perspective view of the slotted tube on which the sleeve shown in Fig. 6 is mounted.

In the drawings, A represents an internally threaded pipe connection which is adapted to be attached to a faucet or other externally threaded member. The lower end of the connecting member A is reduced in diameter, as at 2, which reduced portion is threaded to receive the upper end of a tube 3. The connecting member A is further reduced below the threaded portion 2 to form a shoulder 4 which forms a seat for a packing ring 4′, which ring is thus disposed in an annular groove formed by the outer wall of the lower end of the member A and the inner wall of the tube 3.

The lower end of the tube 3 has a horizontally extending flange 5 formed thereon, which flange is provided as a means for retaining a loose sleeve 6 in position on the tube 3, the sleeve 6 being placed on the tube 3 before the latter is screwed on the member A. The sleeve 6 is milled on its outer surface, as at 7, to admit of its being securely grasped by the hand and turned on the tube 3, as later described.

Formed in the tube 3 is a peculiarly shaped continuous slot, one end of which opens to the lower end of the tube, beneath the flange 5, as shown in Fig. 7. This slot leads parallel with the axis of the tube for a short distance, as indicated at $a$, then turns at nearly right angles and extends approximately half way around the tube, as indicated at $b$, this portion of the slot being disposed at an angle in relation to the lateral diameter of the tube to form an inclined slot, the purpose of which will become apparent hereinafter.

The sleeve 6 is provided with a diagonal slot $c$ which extends approximately half way around the sleeve and is inclined in a direction opposite that of the diagonal slot $b$ in the tube 3. The lower end of the slot $c$ in the sleeve 6 terminates in a longitudinally extending groove $d$ formed by offsetting or raising the metal of which the sleeve is formed at this point. The groove $d$ opens to the lower end of the sleeve and is adapted to register with the slot $a$ in the tube 3, as shown in Fig. 4, a lug 7′ being formed on the flange 5 to limit the movement of the sleeve 6 in one direction and thus insure the alinement of the slot $a$ and the groove $d$.

The above mentioned parts, when assembled as shown in Fig. 4, form the female member of our hose coupling and may be permanently attached to a hose or hydrant.

The male member of the coupling consists of an externally threaded member B which is adapted to be attached to a nozzle, hose or any internally threaded member. The member B has a tubular extension 8 formed thereon, as shown in Fig. 5, which is designed to be inserted within the tube 3 with the outer surface of the tubular extension 8 closely contacting with the inner surface of the tube 3, the outer end of the tube 8 contacting with the packing ring 4′, as shown in Fig. 2.

Mounted on the tube 8 is a stud 9 which projects a distance from the outer face of the tube approximately equal to the combined thickness of the tube 3 and sleeve 6.

In connecting the tubular member 8 to the female member of the coupling, the groove $d$ in the sleeve 6 is first registered with the slot $a$ in the tube 3, as shown in Fig. 4, the lug 7' on the flange 5 abutting against the raised portion of the sleeve 6 which bridges the groove $d$. The tube 8 is then inserted in the lower end of the tube 3; the stud 9 entering the combined slot $a$ and groove $d$ and passing from thence into the diagonal slot $b$ in the tube 3. The member 3 is then given a slight turn to the right so as to cause the pin 9 to move upward in the diagonal slot $b$, thereby bringing the outer end of the tube 8 in close contact with the packing ring 4'. The inclined lower wall of the slot $b$ acts as a wedge on the stud 9 to retain the tube 8 in its innermost position in the tube 3. As the stud 9 is moved upward in the slot $b$ it also travels upward in the diagonal slot $c$ in the sleeve 6, the latter turning on the tube 3. When the tube 8 has reached its uppermost position in the tube 3 the sleeve 6 is turned a short distance to the right so as to further wedge the stud 9. The slot $c$ being disposed so as to cross the slot $b$ as shown in Fig. 1, the sleeve 6 will act as a wedge to permit any movement of the tube 3 on the tube 8, thus securely locking the parts together.

To uncouple the coupling, the sleeve 6 is turned to the left on the tube 3, thereby forcing the stud 9 down the inclined slots $b$—$c$ so that it will enter the slot $a$ to permit of the removal of the tube 8 from the tube 3.

While we have shown the invention as applied to a hose-coupling, it is manifest that it is equally applicable for use as a pipe coupling in connecting lengths of pipe, or it may be employed in coupling or joining together any other members in which it is found desirable to make a detachable connection, such, for instance, as in electric light socket construction, and similar devices.

Having thus described our invention, what we claim and desire to secure by Letters-Patent, is—

1. In a coupling of the character described, the combination with a male member comprising a tube having a threaded portion and stud formed thereon, of a female member consisting of a tube formed with a longitudinal slot and a diagonal slot, a flange formed on one end of the tube, an attaching member on the other end of the tube, and a sleeve mounted to rotate on said slotted tube having a longitudinal slot and a diagonal slot, said diagonal slots on the tube and sleeve extending in opposite directions and arranged to cross each other, the stud on the male member adapted to extend through the diagonal slots at their point of intersection.

2. In a coupling of the character described, the combination with a male member comprising a tube having a threaded portion and stud formed thereon, of a female member consisting of a tube formed with a longitudinal slot and a diagonal slot, a flange formed on one end of the tube, an attaching member on the other end of the tube, a sleeve mounted to rotate on said slotted tube having a longitudinal slot and a diagonal slot, said diagonal slots on the tube and sleeve extending in opposite directions and arranged to cross each other, the stud on the male member adapted to extend through the diagonal slots at their point of intersection, and means on the slotted tube and sleeve for registering the longitudinal slots.

3. In a coupling of the character described, the combination with a male member comprising a tube having a threaded portion and stud formed thereon, of a female member consisting of a tube formed with a longitudinal slot and a diagonal slot, a flange formed on one end of the tube, an attaching member on the other end of the tube, a sleeve mounted to rotate on said slotted tube having a longitudinal slot and a diagonal slot, said diagonal slots on the tube and sleeve extending in opposite directions and arranged to cross each other, the stud on the male member adapted to extend through the diagonal slots at their point of intersection, means on the slotted tube and sleeve for registering the longitudinal slots, and a packing ring disposed in a groove formed on the attaching member against which the outer end of the male member seats.

In testimony whereof we have hereunto set our hands in the presence of two subscribing witnesses.

JOHN W. STINE.
JOHN E. STINE.

Witnesses:
CHARLES EDELMAN,
C. C. COOK.